United States Patent [19]
Stork et al.

[11] 3,816,976
[45] June 18, 1974

[54] PROCESS FOR THE PURIFICATION OF ACETYLENE AND ETHYLENE

[75] Inventors: Karl Stork, New York, N.Y.;
Stephen J. Markbeiter, Edison, N.J.;
Louis Kniel, Scarsdale, N.Y.

[73] Assignee: The Lummus Company, Bloomfield, N.J.

[22] Filed: July 15, 1971

[21] Appl. No.: 162,765

[52] U.S. Cl............................ 55/48, 62/17, 55/51, 55/64
[51] Int. Cl.......................................... B01d 19/00
[58] Field of Search...................... 62/17; 55/63–65, 48–51; 260/699, 679 X

[56] References Cited
UNITED STATES PATENTS

| | | | |
|---|---|---|---|
| 2,236,964 | 4/1941 | Babcock | 62/17 |
| 2,762,453 | 9/1956 | Alexander | 260/679 A |
| 2,805,733 | 9/1957 | Stanton | 260/679 A |
| 2,809,710 | 10/1957 | Hachmuth | 55/65 |
| 2,909,038 | 10/1959 | Williams et al. | 55/64 |
| 2,943,703 | 7/1960 | Thayer | 55/65 |
| 3,023,842 | 3/1962 | Grover et al. | 55/64 |
| 3,230,690 | 1/1966 | Nishioka | 62/17 |
| 3,260,057 | 7/1966 | Becker | 62/17 |

*Primary Examiner*—Norman Yudkoff
*Attorney, Agent, or Firm*—Marn & Jangarathis

[57] ABSTRACT

An improved process for the separation and purification of high purity acetylene and ethylene from a gaseous hydrocarbon comprised of acetylene and ethylene wherein the gaseous hydrocarbon is contacted at an elevated pressure with a selective solvent in an amount sufficient to absorb all of the acetylene and concurrent absorption of a portion of the ethylene. The enriched selective solvent is subjected at the same pressure to a stripping operation whereby a portion of the ethylene is stripped therefrom. The partially stripped enriched solvent is cooled and introduced into a second stripping zone operated at low pressure wherein the remaining ethylene is stripped therefrom and an acetylene-enriched selective solvent is obtained from which high purity acetylene is subsequently recovered.

10 Claims, 1 Drawing Figure

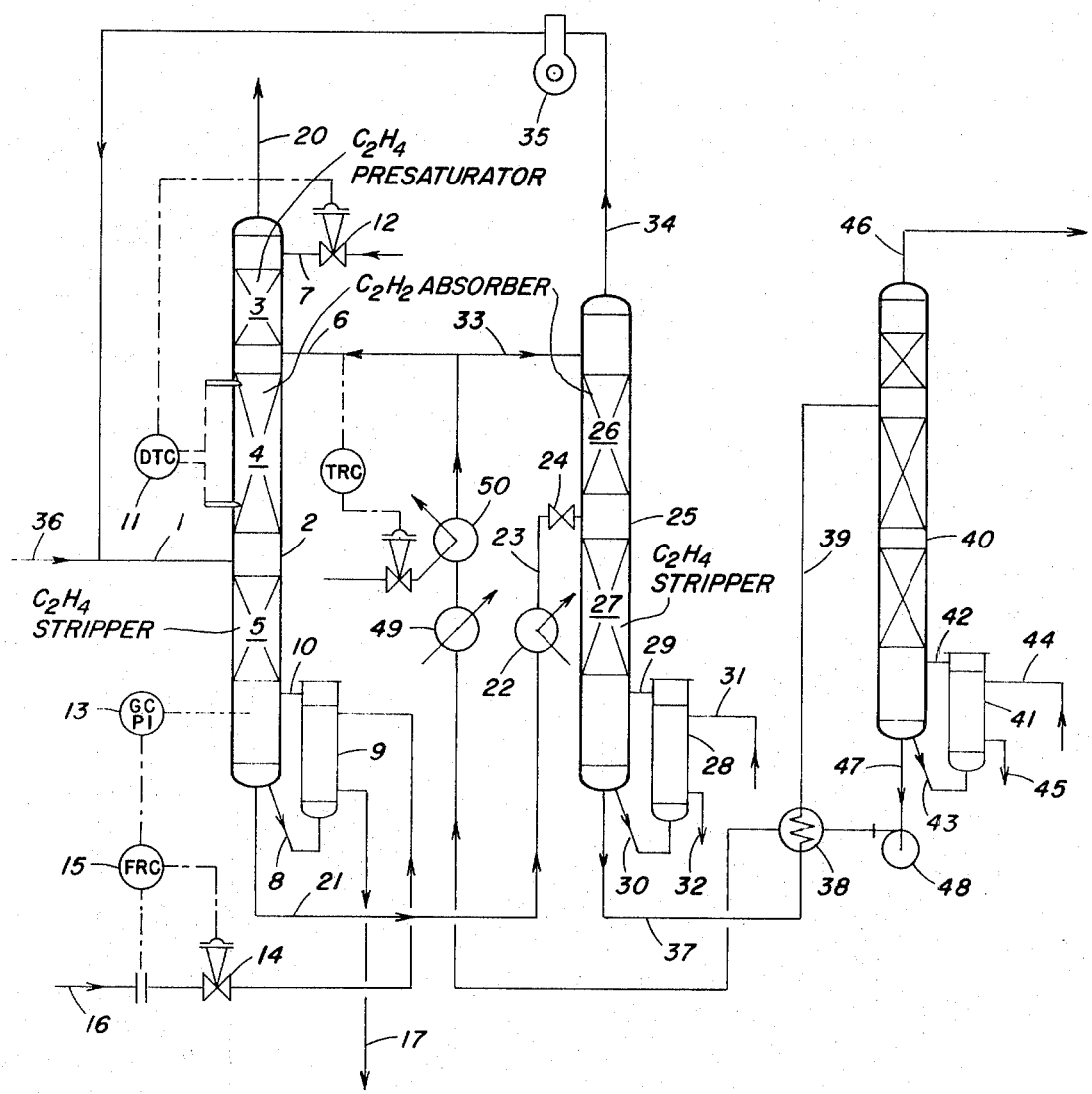

PROCESS FOR THE PURIFICATION OF ACETYLENE AND ETHYLENE

BACKGROUND OF THE INVENTION

As described in U.S. Pat. No. 3,055,183, ethylene may be separated from an effluent produced by the pyrolysis of ethane, propane and heavier hydrocarbons in tubular furnaces. Ethylene as a raw material has a plurality of uses notwithstanding a wide variance in the purity of an ethylene stream. In some uses, the purity of the ethylene stream may be as low as 95 mole percent whereas in other instances, the purity must be as high as 99.9 mole percent, since minor quantities of hydrocarbon contaminants in the ethylene have a deleterious effect on a desired end product, e.g., in the manufacture of polyethylene, minor quantities of acetylene are undesirable.

In most pyrolysis processes for producing ethylene, of from 1 to 2 parts of acetylene are produced for every 100 parts of ethylene and for large plants, the recovery of a substantially pure acetylene stream is economically feasible. Acetylene has been primarily recovered in separation processes by utilizing selective solvents, such as acetone, DMF, (dimethyl formamide) N-methylpyrrolidone and the like, from a gaseous stream containing ethylene and acetylene wherein hydrogen, methane, ethane and $C_3+$ hydrocarbons have been preliminarily removed in conventional separation stages.

Generally, the selective solvent, such as DMF, is introduced into an absorber having a pressure of about 300 psig to absorb the acetylene together with a portion of the ethylene in the incoming feed stream. The quantity of ethylene absorbed depends on the temperature and partial pressure of ethylene and ethylene solubility in the selective solvent. To obtain acetylene in a pure state, ethylene must be first separated from the enriched solvent with the subsequent separation of acetylene therefrom. Such separations have been effected in diverse methods.

In one such method, the enriched solvent is introduced into a portion of a low pressure zone under conditions whereby a portion of the ethylene is flashed from the enriched solvent with the remaining portion being stripped therefrom either by reboiling or by stripping with purified acetylene, such as disclosed in U.S. Pat. No. 2,805,733 to Stanton. In another method, the enriched solvent is expanded over a plurality of pressure states, such as disclosed in U.S. Pat. No. 2,805,733, however, elaborate and detailed subsequent processing is required to produce product stream comprised of 90 volume percent acetylene. In still another method, the residual ethylene is totally stripped in a high pressure stripping zone by bringing the enriched solvent to a higher temperature over a reboiler. Since practically pure acetylene vapors at high pressure will leave the reboiler in this instance, this method requires sophisticated measures to contain possible deflagrations.

OBJECTS OF THE INVENTION

It is a principal object of the invention to provide an efficient and economical method for separating and purifying acetylene from a gaseous stream comprised of acetylene and ethylene.

Another object of the invention is to provide an improved process for stripping ethylene from an ethylene-acetylene enriched selective solvent thereof.

Still another object of the invention is to provide an improved process and apparatus for separating and purifying acetylene and ethylene from a gaseous stream comprised thereof utilizing a selective solvent.

A further object of the present invention is to provide an improved process and apparatus for separating and purifying acetylene whereby solvent circulation is substantially reduced thereby reducing equipment size and power requirements.

A still further object of the present invention is to provide an improved process and apparatus for recovering an acetylene product stream and an ethylene product stream having a purity of at least 99.9 percent.

These and other objects and a fuller understanding of the invention may be had by referring to the following description taken in conjunction with the accompanying drawing, in which the FIGURE is a schematic flow diagram illustrating a preferred embodiment of the invention for separating and recovering high purity acetylene and ethylene from a gaseous hydrocarbon mixture produced by the pyrolysis of a hydrocarbon feed.

BRIEF DESCRIPTION OF THE INVENTION

Prior to treatment in the purification and separation process of the invention, a pyrolytic gaseous mixture is preliminarily treated to remove undesirable components which have a tendency to foul processing equipment and generally make the recovery of ethylene more difficult. Typical of undesirable components which may be removed are carbon dioxide, water, tar-like materials and liquid aromatics. Following the removal of these undesirable components, hydrogen, methane, ethane and the $C_3+$ hydrocarbons are removed from the pyrolytic gaseous mixture to provide the feed to the separation process, such feed normally containing at least 30 mole percent ethylene.

In accordance with the invention, it is proposed to strip ethylene from an enriched selective solvent including acetylene and ethylene utilizing two stripping zones, i.e., a high pressure stripping zone in direct association with the absorption zone and operating essentially at the pressure of the absorption zone, and a low pressure stripping zone. Partial separation of the ethylene from the enriched solvent is effected in the first stripping zone under conditions such that the partial pressure of acetylene does not exceed a preset value of from 10 to 12 psia., since it is well known that a partial pressure of acetylene in excess of about 17 psia. presents an explosive condition.

An important aspect of the invention is the continuous monitoring of the acetylene partial pressure in the first stripping zone to prevent any hazardous condition from arising. This is accomplished by monitoring the partial pressure of the acetylene in the vapors leaving the reboiler (where the concentration of acetylene is highest) for the high pressure stripping zone over a gas chromatograph with pressure cell and pressure compensation which indirectly controls the flow of heat to the reboiler thereby providing a process which is independent of pressure upsets in the absorption zone and changes in composition of the vapor feed to the absorber. Generally, about two-thirds of the ethylene will be separated from the enriched solvent in the high pressure stripping zone, e.g., 250 to 350 psia, without exceeding a partial pressure of acetylene of 17 psia. Stripping of ethylene from the enriched solvent is completed in the low pressure stripping zone, e.g., 15 to 25 psia, by bringing the enriched solution, before leaving the low pressure zone, to a temperature at which the solvent required for the high pressure absorption zone plus the solvent required to re-absorb the acetylene in the vapors leaving the low pressure stripping zone, will dissolve all of the acetylene entering in the feed, at the operating pressure of the low pressure zone, generally from 15 to 25 psia, preferably 18 to 20 psia. In order to effect such operation in the low pressure zone, there is provided a sub-cooler between the stripping zones to reduce the temperature of the partially stripped enriched solvent to induce adequate circulation, i.e., commensurate stripping over the low pressure stripping zone.

DETAILED DESCRIPTION OF THE DRAWING

Referring to the drawing, a hydrocarbon mixture, preferably of the type described above is introduced through line 1 into tower 2 comprised of a presaturation section, an absorption section and a stripping section, generally indicated as 3, 4 and 5, respectively, and operated at a pressure of from about 250 to 350 psia. A heat balance is maintained over the tower 2 by the temperature level of the selective solvent introduced into tower 2 through line 6, the temperature level of the liquid ethylene introduced into the tower 2 in line 7 and by the bottoms in line 8 which pass through reboiler 9 and are heated to the desired temperature level prior to re-introduction into tower 2 through line 10.

Acetylene absorption is accomplished utilizing any one of the aforementioned selective solvents by passing a sufficient quantity of presaturized solvent through the absorption section of the tower 2. In the interest of clarity, the invention will be described with specific reference to the use of DMF as the selective solvent, it being understood that the other selective solvents may be used with concomitant alterations in processing conditions. Presaturation of the solvent is accomplished by introducing liquid ethylene in line 7 into tower 2 above the presaturation section 3 disposed above line 6 at which point the selective solvent is introduced into tower 2. Presaturation of the solvent substantially reduces solvent requirements of the tower 2, since most solvents will also absorb ethylene which increase solvent temperatures and significantly reduce the solvents capacity to absorb acetylene in the absence of such presaturation.

It is important to control the amount of liquid ethylene introduced into the tower 2 by line 7 to the required amount since excess ethylene will form a second phase consisting mainly of ethylene and some dissolved selective solvent which would pass to the stripping section 5 wherein such second phase would impose a constant temperature profile over all or a part thereof inhibiting or even suppressing the stripping of ethylene from the enriched solvent. To function properly the stripping section 5 must be allowed to assume its own uniformly increasing temperature profile toward the reboiler vapors entering tower 2 in line 10.

Consequently, in order to maintain the correct amount of ethylene to be introduced for saturation of the solvent, a temperature controller is provided to maintain the temperature constant of the solvent introduced into tower 2 through line 6. The temperature should be the same as the temperature of the ethylene in line 7 which is set by the operating pressure of the absorption section 4. As acetylene in the gaseous feed is being absorbed by the presaturated solvent during passage through absorption section 4, the presaturated solvent will warm slightly and some slight amount of ethylene will be released. This will result in a net increase in temperature of the enriched solvent over the absorption section 4 of from 10° to 15° F. If an excessive amount of ethylene is introduced, a temperature increase will not develop, and the absorption section 4 will show an isothermal temperature profile. Such effect will be made use of by maintaining the solvent slightly on the lean side of presaturation. By installing a temperature measuring device about two-thirds down the absorption section 4 and by using a differential temperature controller, generally indicated as 11, the flow of ethylene to the absorption section 4 may be controlled by valve 12 to maintain a constant temperature differential between the solvent entering the absorption section 4 and enriched solvent entering the lower portion of the tower 2.

The enriched solvent including acetylene and ethylene is passed downwardly from the absorption section 4 to the stripping section 5 wherein a portion of the absorbed ethylene is stripped therefrom by vapors in line 10 introduced from reboiler 9. As hereinbefore mentioned the temperature of the enriched solvent is carefully controlled to maintain the partial pressure of acetylene in the stripping section 5 below a preset safe value of about 10 to 12 psia. The partial pressure of acetylene is monitored over a gas chromatograph 13 which will indirectly activate a valve 14 through a flow rate control device 15 thereby controlling the quantity of intermediate heat transfer fluid medium, such as steam, in line 16 passed to reboiler 9 and withdrawn therefrom through line 17.

Substantially pure ethylene is withdrawn from tower 2 through line 20 and an enriched solvent, as net bottoms, is withdrawn through line 21. The enriched solvent including of acetylene and ethylene is passed through a heat exchanger 22 wherein the solvent is cooled by 35° to 65° F. by indirect contact with an intermediate heat transfer fluid and is then passed through line 23 under the control of valve 24 to reduce the pressure thereof, e.g., from 15 to 25 psia prior to introduction into a stabilizer tower 25 comprised of an absorption section and a stripping section, generally indicated as 26 and 27, respectively, and a reboiler 28. The thus cooled enriched solvent is passed downwardly through the stripping section 26 wherein ethylene and a portion of the acetylene is stripped therefrom by stripping vapors in line 29 introduced into the tower 25 below the stripping section 26. The stripping vapors in line 29 are provided by passing a portion of the tower bottoms in line 30 through the reboiler 28 in indirect heat transfer relationship to a suitable medium, such as steam, entering through line 31 and leaving through line 32, at a heat level necessary to strip the ethylene and a portion of the acetylene from the enriched solvent. The stripped gaseous stream is passed upwardly through the absorption section 26 of the tower 25 wherein the gaseous stream is contacted with a selective solvent introduced through line 33 in an amount necessary to absorb acetylene therein.

The temperature level to which the enriched solvent in line 21 is cooled is determined by the temperature level of the solvent requirements for tower 2 (high pressure absorption) and the solvent requirements for tower 25 (re-absorption of acetylene) at the operating pressure of the tower 25. Cooling of the enriched solvent in line 21, increases its capacity to absorb acetylene as the solvent is passed downwardly through the stripping section 27 of the tower 25 in contact with the reboiler vapors (rich in acetylene) in line 29; i.e., acetylene displaces ethylene dissolved in the solvent.

Very little acetylene rises in the vapors from the feed plate of the stabilizer tower 25 and very little additional selective solvent is required in the absorption section 27 of the stabilizer tower 25 to re-absorb a major portion of such acetylene. The acetylene concentration gradient in the vapor is indicative of the performance of the stabilizer tower 25: it drops from 100 vol. percent acetylene at the reboiler outlet to 1 to 3 vol. percent acetylene and 99 to 98 vol. percent ethylene in the vapor leaving the stabilizer. While it would be desirable to operate the stabilizer tower 25 under conditions whereby 0 percent acetylene is withdrawn from the tower overhead, it is not practical instrumentationwise, where the tower overhead may be recycled to be combined with pyrolysis feed to the process for complete acetylene recovery.

The gaseous overhead primarily comprised of ethylene in line 34 withdrawn from the stabilizer tower 25 is passed by pump 35 and is combined with a gaseous hydrocarbon in line 36 to form the feed in line 1 introduced into tower 2. The net bottoms (acetylene-enriched solvent) in line 37 is passed through heat exchanger 38 and is introduced through line 39 into acetylene stripping tower 40 including reboiler 41. Acetylene is stripped from the solvent by reboiler vapors introduced through line 42 from reboiler 41 and formed by passing a portion of the tower bottoms in line 43 to reboiler 41, operated in a manner similar to reboiler 28, e.g., steam entering through line 44 and leaving through line 45. Substantially pure gaseous acetylene is withdrawn from stripping tower 40 through line 46 and is passed to subsequent units (not shown) for further processing. The lean solvent, as net tower bottoms in line 47, withdrawn from tower 40 by pump 48 is passed through heat exchangers 38, 49 and 50 and divided into lines 6 and 33 to provide the solvent requirements for towers 2 and 25, respectively, as hereinbefore discussed.

It will be appreciated that the total solvent circulation will be less and also the volume of recycle vapors will be less than in comparable plants thereby improving plant performance. Additionally, it will be appreciated that the process is independent of pressure upsets in the tower 2 and is independent of changes in composition of the feed in line 1.

The following example illustrates the invention but is not to be construed as limiting the same.

A hydrocarbon feed in line 36 comprised of 1.33 mols of acetylene per 100 mols of ethylene is introduced into tower 2, having a pressure of 290 psia. 11 mols of DMF at a temperature of −31° F. is introduced into tower 2. by line 6 and is admixed with 7.5 mols of ethylene introduced through line 12 to form the presaturated solvent which contacts the gaseous stream introduced in line 1. An ethylene product stream comprised of 99.99 volume ethylene is withdrawn as product from tower 2 through line 20. The enriched solvent in line 21 at a temperature of 80° F. is passed to heat exchanger 22, subcooled to a temperature of 30° F. and introduced into stabilizer tower 25. 4 mols of DMF at a temperature of −31° F. is introduced into tower 28 by line 33 to absorb acetylene stripped from the enriched solvent. The acetylene enriched solvent in line 37 at a temperature of 110° F. is passed to stripper 40 from which acetylene having a purity of 99.99 percent is withdrawn by line 46. The solvent requirements for the process of the invention is 75 percent less than the solvent requirements in processes employing pure acetylene as the stripping medium in the second zone.

While we have shown and described a preferred form of the invention, we are aware that variations may be made thereto and we, therefore, desire a broad interpretation of the invention within the scope of the disclosure herein and the following claims.

What is claimed is:

1. A process for separating and purifying acetylene from a gaseous mixture comprised of acetylene and ethylene, comprising:
   a. passing said gaseous mixture in countercurrent contact with a refrigerated solvent selective for acetylene in an absorption zone of a first stripper-absorber column operated at an elevated pressure to absorb said acetylene and produce an enriched solvent containing said acetylene and a portion of said ethylene;
   b. passing the enriched solvent to a stripping zone of said first stripper-absorber column to strip a portion of the ethylene from the enriched solvent by vapor reboiled from said enriched solvent;
   c. cooling stripped enriched solvent from step (b) by heat exchange;
   d. introducing the cooled stripped enriched solvent into a stripping zone of a second stripper-absorber column operated at a reduced pressure to strip the remaining portion of ethylene and a portion of the acetylene by vapors reboiled from said enriched solvent in said stripping zone;
   e. passing stripped ethylene vapors containing some acetylene from step (d) through an absorption zone of said second stripper-absorber column in countercurrent contact with refrigerated solvent selective for acetylene to reabsorb acetylene from the stripped ethylene vapors; and
   f. recovering acetylene from enriched solvent stripped of ethylene withdrawn from the second stripper-absorber column.

2. The process as defined in claim 1 wherein said selective solvent of step (a) is presaturated with ethylene by introducing ethylene into the upper portion of said first stripper-absorber column.

3. The process as defined in claim 1 wherein the partial pressure of acetylene in the reboiled vapors of step (b) is monitored to control the heat level of said reboiled vapors.

4. The process as defined in claim 2 wherein the temperature of said absorption zone of the first stripper-absorber column is sensed to control the amount of ethylene introduced into the first stripper-absorber column to presaturate the selective solvent.

5. The process of claim 4 wherein the temperature of the refrigerated selective solvent introduced into the first stripper-absorber column is maintained constant.

6. The process as defined in claim 1 wherein substantially pure ethylene is recovered from step (a).

7. The process as defined in claim 1 wherein the partially stripped enriched solvent is cooled in step (c) by 35° to 65° F.

8. The process as defined in claim 1 wherein said first stripper-absorption column is operated at a pressure of from about 250 to 350 psia.

9. The process as defined in claim 1 wherein said stripping zone of step (d) is at a pressure of from about 15 to 25 psia.

10. The process as defined in claim 1 wherein dimethyl formamide is the selective solvent.

* * * * *

UNITED STATES PATENT OFFICE
CERTIFICATE OF CORRECTION

Patent No. 3,816,976            Dated  June 18, 1974

Inventor(s) KARL STORK et al

It is certified that error appears in the above-identified patent and that said Letters Patent are hereby corrected as shown below:

In the listing of the inventors on the first page of subject letters patent as printed under [75] "Louis Kniel" should be --Ludwig Kniel--.

Signed and sealed this 12th day of November 1974.

(SEAL)
Attest:

McCOY M. GIBSON JR.                C. MARSHALL DANN
Attesting Officer                  Commissioner of Patents